Sept. 27, 1949.  W. G. HARVEY  2,483,094
STRIPPING AND KNOCKOUT MECHANISM FOR MOLDING DIES
Filed Nov. 23, 1946  2 Sheets-Sheet 1
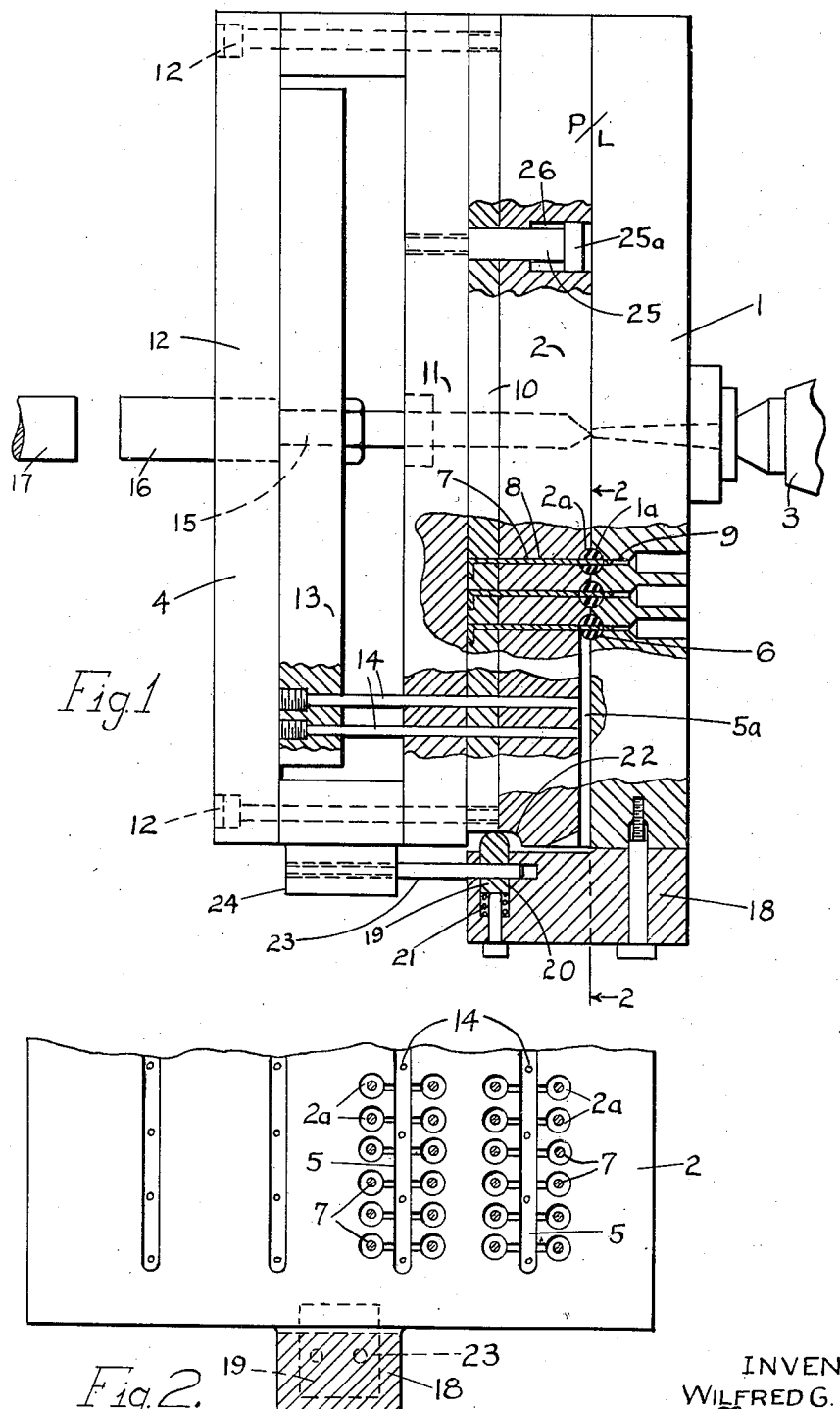
INVENTOR
WILFRED G. HARVEY
BY Owen W. Kennedy
ATTORNEY Sept. 27, 1949.  W. G. HARVEY  2,483,094
STRIPPING AND KNOCKOUT MECHANISM FOR MOLDING DIES
Filed Nov. 23, 1946  2 Sheets-Sheet 2

INVENTOR
WILFRED G. HARVEY
BY Owen W. Kennedy
ATTORNEY

Patented Sept. 27, 1949

2,483,094

UNITED STATES PATENT OFFICE 2,483,094

STRIPPING AND KNOCKOUT MECHANISM
FOR MOLDING DIES

Wilfred G. Harvey, Leominster, Mass.

Application November 23, 1946, Serial No. 712,004

4 Claims. (Cl. 18—42)

1

The present invention relates to dies or molds of the type that are customarily employed in connection with injection molding machines, and has for its object to provide an improved mechanism for performing separate stripping and knockout operations in connection with the molded articles.

In my pending application Serial No. 667,508 filed May 6, 1946, there is shown and described a mechanism of the above indicated character that is adapted to first move a molded article, as a whole, to strip it from a core and then to apply pressure to the stripped article to eject the entire article from the dies. In the operation of this mechanism, the stripping and knockout operations are separately performed on the molded article in such a manner that the article is freed from the dies without subjecting the article to strains which might result in damaging the article while still in a somewhat plastic condition.

The mechanism of the present invention represents a further application of the principles embodied in the mechanism disclosed in my aforesaid pending application. Briefly stated, the mechanism of the present invention resides in providing one of the relatively movable dies with mechanism for first stripping a molded article of complicated form, or a unitary molding of a large number of small articles, from a set of core pins, while the article or articles remain held in the die, followed by the knockout or ejection of the article or articles from the die by the simultaneous application of force at a large number of separated points. The above and other advantageous features of the invention will hereinafter more fully appear from the following description considered in connection with the accompanying drawings, in which:

Fig. 1 is a view in side elevation of an operating mechanism for molding dies, with the dies in closed position, and certain portions in section.

Fig. 2 is a vertical sectional view along the line 2—2 of Fig. 1, looking in the direction of the arrows, with the molded article removed to show the molding cavities.

Figure 3:
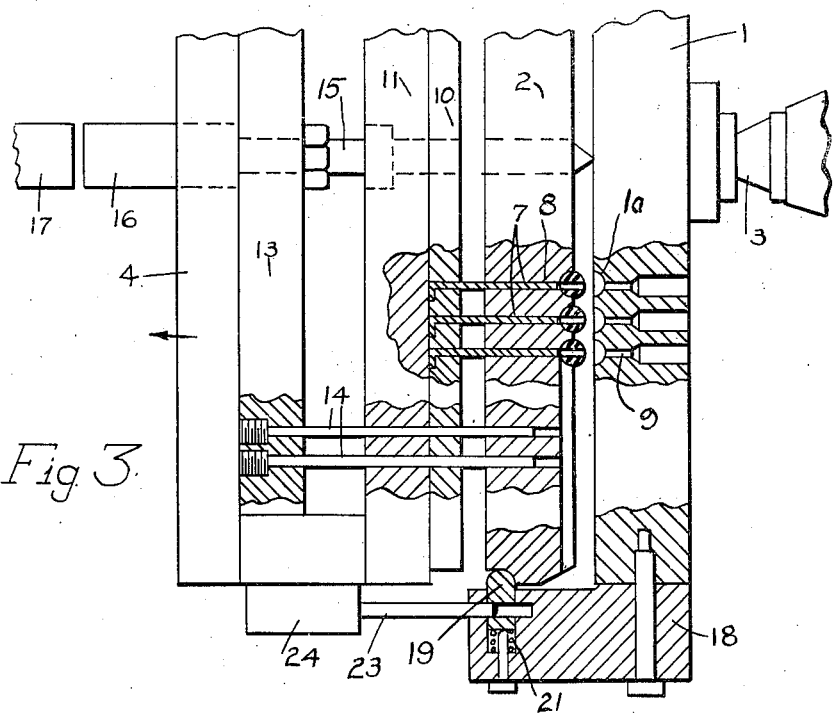
Fig. 3 is a view of a portion of the parts shown in Fig. 1, illustrating the stripping of the core pins from the molded articles.

Referring to the drawings, the invention is shown for purposes of illustration in connection with the relatively movable molds or dies 1 and 2

2 of an injection molding machine of usual construction, which machine provides a suitable nozzle 3 for injecting plastic material into the dies 1 and 2 to form molded articles within molding cavities provided by the dies. As is usual in molding machines, the die 1 is fixed while the die 2 is movable, for which purpose the die 2 is connected to an operating plate 4 which is adapted to be moved to the left by suitable mechanism, not shown, to separate the dies 1 and 2 along the parting line PL. The dies 1 and 2 provide a number of pairs of molding cavities 1a and 2a into which the plastic material from the nozzle 3 is injected through suitable gates 5 provided by the movable die 2 as best shown in Fig. 2. The cavities 1a and 2a are of hemispherical form, so each pair is adapted to produce a molded article 6, such as a bead, with all the articles connected together to form a unitary molding, and the invention provides means for first stripping all of the articles, while still held in the molding cavities, and then ejecting all of the articles, as a unit, from the dies.

For this purpose, the movable die assembly provides a number of core pins 7 extending freely through openings 8 in the movable die 2. When the dies 1 and 2 are closed, as shown in Fig. 1, the core pins 7 extend through the molding cavities 1a and 2a and part way into openings 9 in the fixed die 1. Therefore, when plastic material is injected through the gates 5, each article 6 is molded around a core pin 7, so that, each bead has an opening extending therethrough. The core pins 7 are clamped between plates 10 and 11 and both plates 10 and 11 are secured to the operating plate 4 by bolts 12. It is to be noted that the die 2 is not directly connected to the core plates 10 and 11 but is capable of limited relative movement with respect to these plates when they are first moved by the operating plate 4, for a purpose which will later appear.

The movable die mechanism also provides a knockout plate 13 that is mounted between the plates 4 and 11, with a space between plates 13 and 11. The plate 13 carries a number of knockout pins 14 that extend freely through the plates 10 and 11 into the die 2. The pins 14 are of such length that with the dies 1 and 2 closed, the ends of the pins 14 terminate at the gates 5. As will be evident from a consideration of Fig. 2, the ends of the knockout pins 14 enter the gates 5 between each two series of core pins 7, as indicated in dotted lines.

Figure 4:
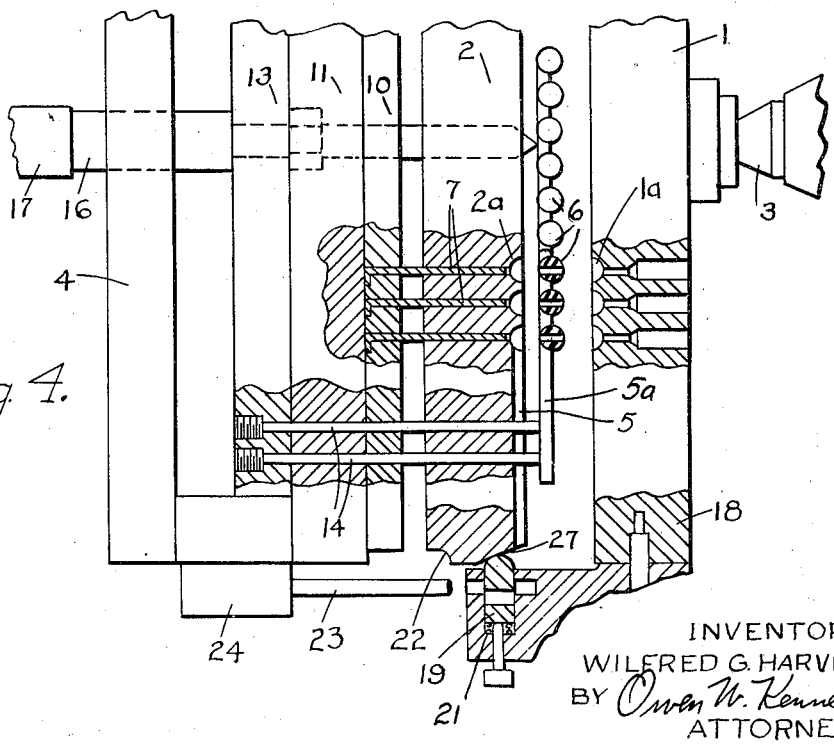
Fig. 4 is a view similar to Fig. 3, illustrating the knockout or ejection of the articles from the die.

For the purpose of causing relative movement between the knockout plate 13, and the core plates 10 and 11, the plate 13 is mounted on a rod 15 carried by a plunger 16 extending freely through the operating plate 4. The plunger 16 extends rearwardly in the direction of a stop 17 that is spaced from the plunger 16 a predetermined distance when the dies 1 and 2 are closed for the molding operation. This stop 17 is mounted on the frame of the machine, not shown, and the relation of parts is such that the knockout plate 13 will move with the operating plate 4 during the first part of the opening movement between the dies 1 and 2 and until the end of the plunger engages the stop 17 as shown in Fig. 4.

As previously pointed out, the die 2 is capable of relative movement with respect to the core plates 10 and 11 and the mechanism provides means for arresting movement of the die 2, as the dies 1 and 2 start to open, so as to withdraw the core pins 7 from the articles 6 while the articles are still held in the molding cavities 2a. For this purpose, the fixed die 1 carries a block 18 which extends along the edge of the movable die 2 and provides a stop plate 19 movable in a slot 20, with springs 21 serving to hold the end of the plate 19 in a notch 22 provided in the die 2. With the die 2 in closed position, the stop plate 19 is held with its end disposed in the notch 22 by means of locking pins 23 carried by a block 24 mounted on the operating plate 4. The pins 23 are movable within the stop plate 19 and serve to positively hold the plate 19 within the notch 22 during a predetermined portion of the opening movement between the dies 1 and 2.

Assuming that articles 6 have been molded within the closed dies 1 and 2, the first step in stripping and ejecting the articles consists in moving the die operating plate 4 to the left, as indicated by the arrow in Fig. 3, to cause an initial separation between the dies 1 and 2 along the parting line PL. When this occurs, the core plates 10 and 11 move with the operating plate 4 and all the other parts of the movable die assembly maintain the relation shown in Fig. 1, as the end of notch 22 approaches the stop plate 19 and the end of plunger 16 approaches the stop 17. However, when the stop plate 19 engages the end of the notch 22 on the die 2 further movement of the die 2 is prevented, since at that time the locking pins 23 are still in the plate 19, as shown in Fig. 3.

Further movement of the core plates 10 and 11 after the die 2 has stopped causes the core pins 7 to be withdrawn from the molded articles 6, as also shown in Fig. 3. At this time, the die 2 is separated from the plate 10 by a distance sufficient to insure withdrawal of the pins from the articles and it is to be noted that at this point the ends of the locking pins 23 are almost withdrawn from the stop plate 19, while the heads 25a of studs 25 carried by the plate 11 have almost reached the limit of their movement in slots 26 provided in the die 2.

Therefore, further movement of the operating plate 4 from the position of Fig. 3 will cause the die 2 to move with the plate 11 through the pull of the heads 25a on the studs 25, so that the pressure exerted on the stop plate 19 will cause the latter to be pushed into the block 18, since the pins 23 have then been fully withdrawn. By this time the end of plunger 16 has engaged the stop 17 so that further movement of the operating plate 4 to the left will cause the plate 13 to remain stationary while the plate 4 carrying the die 2 moves into the position of Fig. 4. When this occurs, relative movement between the die 2 and the knockout pins 14 causes the pins to engage the molded material 5a that connects the articles 6 within the gates 5 and eject the molded articles 6 from the cavities 2a. This operation results in all of the many articles being ejected from the die, as a unit, held together by the gate material 5a, so that all the articles are ejected simultaneously.

With the dies 1 and 2 open, as shown in Fig. 4, it is to be noted that the end of the stop plate 19 bears on an inclined surface 27 provided on the lower edge of the die 2. The springs 21 yieldingly hold the end of the plate 19 on the surface 27, so that when the dies 1 and 2 start to close, the plate 19 will ride on the surface 27, with the plate moving inwardly against the pressure of the springs 21.

When the dies 1 and 2 are nearly closed as shown in Fig 3, the end of the notch 22 reaches a point opposite the plate 19, so that the springs 21 cause the plate 19 to move quickly into the notch. Therefore, by the time dies 1 and 2 are fully closed, as shown in Fig. 1, the plate 19 will be located in the notch 22 where it will be held by the pins 23 on the block 24, so as to stop movement of the die 2 shortly after it again starts to open.

From the foregoing, it is apparent that by the present invention, there is provided an improved stripping and knockout mechanism for molding dies, wherein one of the dies is provided with means for first stripping a large number of molded articles, or a single article of complicated form, without damage, even though the molded material is still in a soft condition. After the stripping operation all of the articles are simultaneously ejected from the die, as a unit, by the application of force to the gate material which joins the articles together.

I claim:

1. A die set adapted to be inserted into a molding machine as a unitary structure, said die set comprising, a pair of cooperating movable and stationary dies, an operating member for carrying and shifting said movable die toward and away from said stationary die, first and second members carried by said operating member between the latter element and said movable die and being relatively movable with respect to each other and initially movable together with said operating member and said movable die as the dies initially open, means carried by said stationary die for arresting movement of said movable die with reference to said first and second members to cause said first member to strip a molded article, means carried by said first member for causing said movable die to resume movement with said operating member, and means carried by said second member for engaging a stationary stop on the molding machine thereby to arrest the movement of said second member and cause the stripped article to be ejected from said movable die as said dies continue to open.

2. A die set adapted to be inserted into a molding machine as a unit, said die set comprising in combination, a stationary die, and a self-contained movable die structure including, a movable die, an operating member for carrying and shifting said movable die toward and away from said stationary die, core and knockout pin members carried by said operating member between the latter element and said movable die and being relatively movable with respect to each other and initially movable together with said operating member and said movable die as the dies initially open, means on said movable die for engaging said stationary die thereby to arrest the movement of said movable die with reference to said core and knockout pin members to cause said core member to strip a molded article, means carried by said core member for causing said movable die to resume movement with said operating member, and means carried by said knockout pin members for engaging a stationary stop on the molding machine thereby to arrest the movement of said knockout pin members and cause the stripped article to be ejected from said movable die as said dies continue to open.

3. A die set for the production of molded article comprising, in combination, a normally stationary die, an operating member for moving toward and away from said stationary die, a movable die carried by said operating member so as to be shiftable to a limited degree relative to and in the direction of movement of said operating member, a core carrier rigidly mounted upon said operating member with the cores thereof slidably passing through said movable die, a knockout pin carrier mounted upon said operating member so as to be shiftable to a limited degree relative to and in the direction of movement of said operating member and with the knockout pins thereof slidably passing through said movable die, means carried by said stationary die for engaging said movable die whenever the latter die is in the close vicinity of said stationary die thereby to cause relative movement between said movable die and said operating member as the latter moves toward and from said stationary die, and means carried by said knockout pin carrier for engaging a positive stationary stop when said operating member reaches the end portion of its movement away from said stationary die thereby to cause relative movement between said operating member and said knockout pin carrier.

4. A die set for the production of molded articles comprising, in combination, a normally stationary die, an operating member for moving toward and away from said stationary die, a movable die carried by said operating member so as to be shiftable to a limited degree relative to and in the direction of movement of said operating member, a core carrier rigidly mounted upon said operating member between said latter element and said movable die with the core pins thereof slidably passing through said movable die, a knockout pin carrier mounted upon said operating member between said latter element and said core carrier so as to be shiftable to a limited degree relative to and in the direction of movement of said operating member and with the knockout pins thereof slidably passing through said core carrier and said movable die, means carried by said stationary die for releasably engaging said movable die whenever the latter die is in the close vicinity of said stationary die thereby to cause relative movement between said movable die and said operating member as the latter moves toward and from said stationary die, and means carried by said knockout pin carrier for engaging a positive stationary stop when said operating member reaches the end portion of its movement away from said stationary die thereby to cause relative movement between sad operating member and said knockout pin carrier.

WILFRED G. HARVEY.

REFERENCES CITED

The following references are of record in the file of this patent:

UNITED STATES PATENTS

| Number | Name | Date |
|---|---|---|
| 1,599,624 | Stern | Sept. 14, 1926 |
| 1,673,054 | Rosenberger | June 12, 1928 |
| 1,941,811 | Morin | Jan. 2, 1934 |
| 1,961,942 | Pack | June 5, 1934 |
| 2,272,718 | MacLagan et al. | Feb. 10, 1942 |
| 2,302,367 | Ericson | Nov. 17, 1942 |